US012554677B2

(12) United States Patent
Griffin et al.

(10) Patent No.: US 12,554,677 B2
(45) Date of Patent: Feb. 17, 2026

(54) ARCHIVING FILES VIA SUPERDENSE CODING

(71) Applicant: Red Hat, Inc., Raleigh, NC (US)

(72) Inventors: Leigh Griffin, Waterford (IE); Stephen Coady, Waterford (IE)

(73) Assignee: Red Hat, LLC, Raleigh, NC (US)

( * ) Notice: Subject to any disclaimer, the term of this patent is extended or adjusted under 35 U.S.C. 154(b) by 698 days.

(21) Appl. No.: 17/966,323

(22) Filed: Oct. 14, 2022

(65) Prior Publication Data

US 2024/0126717 A1 Apr. 18, 2024

(51) Int. Cl.
G06F 16/11 (2019.01)
G06N 10/00 (2022.01)
G06N 10/40 (2022.01)

(52) U.S. Cl.
CPC ........... *G06F 16/113* (2019.01); *G06N 10/00* (2019.01); *G06N 10/40* (2022.01)

(58) Field of Classification Search
CPC ....... G06F 16/113; G06N 10/00; G06N 10/40
USPC .......................................................... 706/62
See application file for complete search history.

(56) References Cited

U.S. PATENT DOCUMENTS

| 10,756,826 B1* | 8/2020 | Coady .................. H04B 10/70 |
| 11,113,621 B2 | 9/2021 | Cortese et al. |
| 11,133,823 B2 | 9/2021 | Griffin et al. |

FOREIGN PATENT DOCUMENTS

KR 102274792 B2 7/2021

OTHER PUBLICATIONS

Hu, et al., "Beating the channel capacity limit for superdense coding with entangled ququarts", Science advances, 2018; 4, Jul. 20, 2018 (Year: 2018).*

(Continued)

*Primary Examiner* — Tsu-Chang Lee
(74) *Attorney, Agent, or Firm* — Dority & Manning, P.A.

(57) ABSTRACT

One embodiment includes a method for quantum-mechanically archiving data. The method includes receiving, by a quantum computing device (QD), a request to store the data. The data may be associated with a file identifier (ID). A set of bits encodes the data in a classical encoding and the set of bits has a first cardinality. In response to receiving the request to store the data, generating, the QD may generate, based on a superdense coding protocol, a quantum-mechanical (QM) encoding of the data via a set of qubits that has a second cardinality that is less than the first cardinality. The QD may cause a generation of a data structure that encodes an association between the file ID and the set of qubits. The QD may further cause a storage of the data structure.

14 Claims, 7 Drawing Sheets

(56) References Cited

OTHER PUBLICATIONS

Nagy, et al., "Using quantum mechanics to enhance information processing", Ph.D thesis, Queen's University, Kingston, Ontario, Canada, Jun. 2007 (Year: 2007).*
Cortese, John A., et al., "Loading Classical Data into a Quantum Computer," arXiv:1803.01958v1 [quant-ph], Mar. 5, 2018, 38 pages.
Devetak, I., et al., "Classical data compression with quantum side information," https://arxiv.org/abs/quant-ph/0209029v4, Jul. 30, 2003, 10 pages.
Hayden, Patrick, et al., "Trading quantum for classical resources in quantum data compression," http://arxiv.org/abs/quant-ph/0204038v1, Apr. 8, 2002, 52 pages.
Renes, Joseph M., et al., "One-Shot Classical Data Compression with Quantum Side Information and the Distillation of Common Randomness or Secret Keys," http://arxiv.org/abs/1008.0452v3, Mar. 24, 2012, 7 pages.

\* cited by examiner

ARCHIVING FILES VIA SUPERDENSE CODING

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently and accurately allocate qubits in real time will be desirable.

SUMMARY

The examples disclosed herein provide archiving data via superdense coding and accessing data that has been archived via superdense coding. The embodiments employ a quantum mechanical mechanism referred to as superdense coding (or superdense encoding). Briefly, superdense coding is a QM encoding protocol that stores data in qubits. The number of qubits required to store the data is less than the number of classical bits that would be required to encode the same amount of data.

One embodiment includes a method for quantum-mechanically archiving data. The method includes receiving, by a quantum computing device (QD), a request to store the data. The data may be associated with a file identifier (ID). A set of bits encodes the data in a classical encoding and the set of bits has a first cardinality. In response to receiving the request to store the data, generating, the QD may generate, based on a superdense coding protocol, a quantum-mechanical (QM) encoding of the data via a set of qubits that has a second cardinality that is less than the first cardinality. The QD may cause a generation of a data structure that encodes an association between the file ID and the set of qubits. The QD may further cause a storage of the data structure.

Another embodiment includes another method for accessing data that has been quantum-mechanically archived. The other method includes receiving, by a quantum computing device (QD), a request to access the data. The data may be associated with a file identifier (ID). A set of qubits may encode the data in a quantum-mechanical (QM) encoding. The set of qubits has a first cardinality. In response to receiving the request to access the data, the QD may generate a classical encoding of the data via a set of bits. Generating the classical encoding may be based on a superdense coding protocol. The set of bits may have a second cardinality that is greater than the first cardinality. The QD may transmit the classical encoding of the data via the set of bits.

Another embodiment is directed to a quantum computing device. The quantum computing device includes a set of qubits, a system memory, and a processor device. The processor device is communicatively coupled to the system memory. The processor device receives a request to store data that is associated with a file identifier (ID). A set of bits encodes the data in a classical encoding. The set of bits has a first cardinality. In response to receiving the request to store the data, the processor devices generates, based on a superdense coding protocol, a quantum-mechanical (QM) encoding of the data via a set of qubits that has a second cardinality that is less than the first cardinality. The processor device causes a generation of a data structure that encodes an association between the file ID and the set of qubits. The processor device causes a storage of the data structure.

In another embodiment, the processor device receives a request to access the data. The data is associated with a file identifier (ID). A set of qubits encodes the data in a quantum-mechanical (QM) encoding. The set of qubits has a first cardinality. In response to receiving the request to access the data, the processor device generates a classical encoding of the data via a set of bits based on a superdense coding protocol. The set of bits has a second cardinality that is greater than the first cardinality. The processor device transmits the classical encoding of the data via the set of bits.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
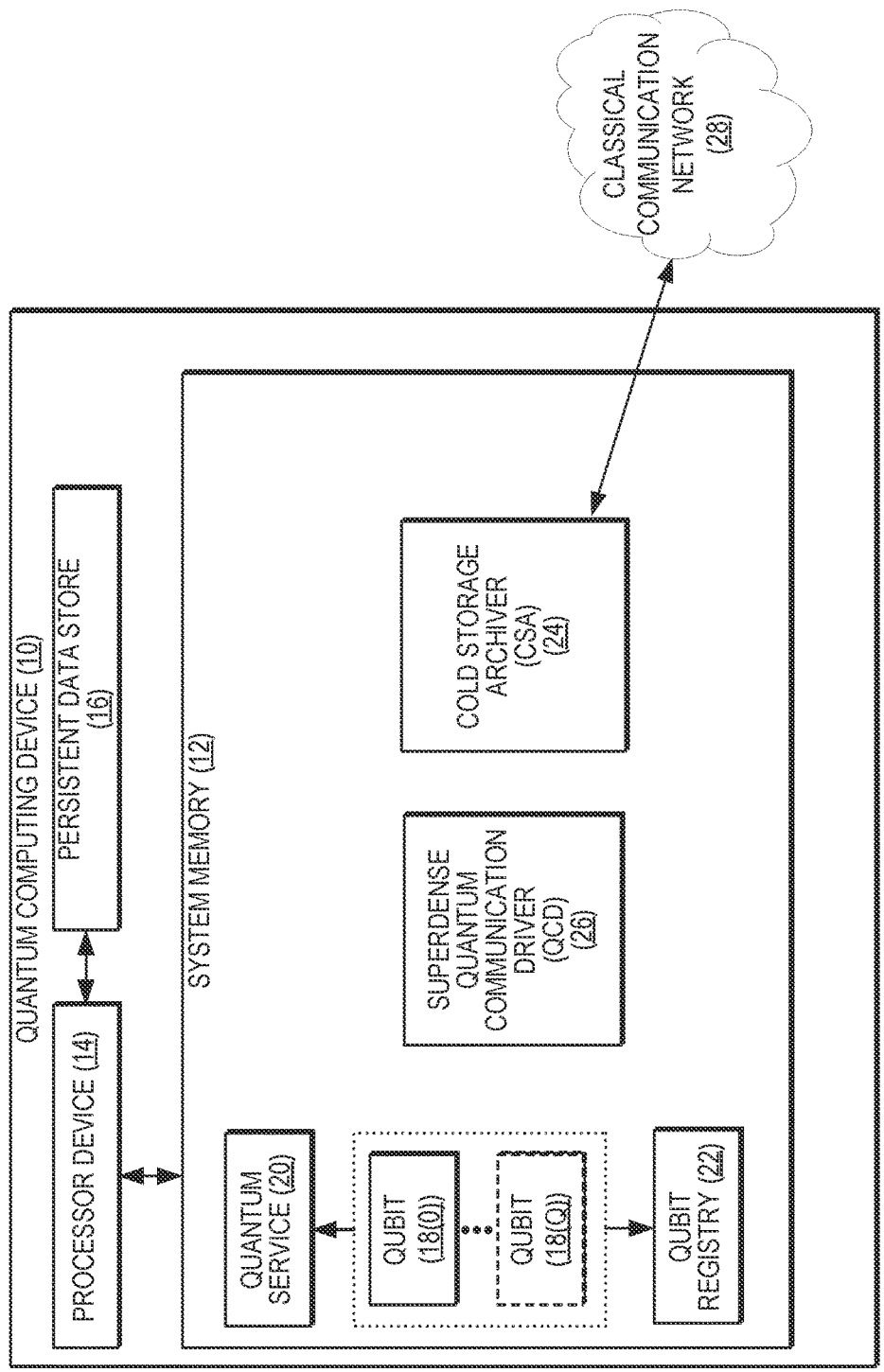
FIG. 1 is a block diagram of a quantum computing device, which may be employed to practice example embodiments.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first executing quantum service" and "second executing quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing and quantum information processing involve the use of quantum bits, referred to herein as "qubits," which have characteristics that differ from those of classical (i.e., non-quantum) bits used in classical computing. Qubits may be employed by quantum services that are executed by quantum computing devices. In contrast to classical bits, which store classical encodings of data, the superposition of quantum states of qubits may be employed to store a quantum-mechanical (QM) encoding of the data. The embodiments employ a quantum mechanical mechanism referred to as superdense coding (or superdense encoding). Briefly, superdense coding is a QM encoding protocol that stores data in qubits. The number of qubits required to store the data is less than the number of classical bits that would be required to encode the same amount of data.

That is, a QM encoding of data (via a superdense coding protocol) may be "smaller" than a classical encoding of the same data. The term smaller is used above to indicate that the number of qubits in a set of qubits (e.g., the cardinality of the set) that is used to store the superdense coding-based QM encoding of the data is less than the number of classical bits in a set of classical bits required to store the corresponding classical encoding of the same data. In some embodiments, a single qubit may be employed to encode two classical bits of data (or information). Thus, the number of qubits employed to encode data (via a superdense encoding) may be one-half the number of classical bits required to encode the same data.

The embodiments employ superdense coding to archive data associated with a classical file. The file (and its associated data) may be QM archived in long term storage via superdense coding. The archived data is stored in a QM encoding via quantum states of a set of qubits. Because the data is archived for long-term storage, it may be said that the embodiments are directed towards a cold storage archiving employing QM encoding means.

Similar to how a set of classical bits encoding data is referred to as a file (e.g., a classical file), the set of qubits that are employed to store the data may be referred to as a "quantum file." Because the data is stored quantum mechanically via superdense coding, the number of qubits required to archive the data is less than the number of classical bits that would be required to archive the file in a classical. That is, the quantum file archiving the data may be half the size of a classical file archiving the data classically encoded, where the size of the various files is measured via the number or qubits or the number of classical bits that are requires to store the data for the (quantum or classical) file.

More specifically, the embodiments include a first cold storage archiver (CSA) that can take a classical file as an input. A party may provide the classical file to the first CSA with the intention to archive the classical file in cold storage (e.g., long-term storage). The first CSA may be implemented by a classical computing system (e.g., a classical computing device) or a QCS (e.g., a quantum computing device). The first CSA may receive the file and calculate the file size (e.g., the size of the classical file as measured in classical bits).

The first CSA may interface with a second CSA implemented via a QCS. For example, the first CSA may provide the classical file to the second CSA, via a classical communication network. Along with the classical file, the first CSA may provide the second CSA with a storage request, which indicates that the file is to be archived for long-term storage.

The second CSA may process the classical file and check for available qubits accessible via the QCS. To check for available qubits, the second CSA may employ the services of a qubit registry service (QRS) of the QCS. For instance, the second CSA may provide the QRS with a request to register (or allocate) qubits for the long-term storage of the data encoded in the classical file. The QRS may reply to the request with the number of qubits available for usage. The second CSA may perform a simple file size calculation (e.g., ½ the number of required classical bits) to ascertain whether the QCS can service the storage request received from the first CSA.

The second CSA then interfaces with a quantum communication driver (QCD) implemented (or at least accessible) by the QCS. The QCD may implement a driver to a superdense coding API. Via the QCD, the classical file is taken and for every 2 bits, the classical file is transposed into a single qubit. The second CSA may monitor the incoming superdense steam and record the qubit in the order received to allow for the later recreation of the classical file. A file ID may be saved. In future file retrieval requests, when the QCS needs to restore the file to classical bits, the second CSA can pull the file ID, discover the corresponding qubits, and stream corresponding classical bits (to the requester) in the correct order.

Aspects of the present disclosure provide a number of technical effects and benefits. For instance, fewer qubits are required to archive data via the embodiments, as compared to the number of bits that would be required for conventional archival approaches.

FIG. 1 is a block diagram of a quantum computing device 10 that comprises a system memory 12 and a processor device 14. The quantum computing device 10 may be referred to as a quantum computing system (QCS). The quantum computing device 10 further comprises a persistent data store 16 (e.g., a hard drive or Solid State Drive (SSD), as non-limiting examples). It is to be understood that the quantum computing device 10 in some examples may include constituent elements in addition to those illustrated in FIG. 1. The quantum computing device 10 operates in quantum environments but is capable of operating using classical computing principles or quantum computing principles. Thus, in some implementations, portions of the quantum computing device 10 (e.g., the cold storage archiver (CSA) 24 described further herein) may be executed using classical computing components and/or algorithms.

When using quantum computing principles, the quantum computing device 10 performs computations that utilize quantum-mechanical phenomena, such as superposition and/or entanglement states. The quantum computing device 10 may operate under certain environmental conditions, such as at or near zero degrees (0°) Kelvin. When using classical computing principles, the quantum computing device 10 utilizes binary digits that have a value of either zero (0) or one (1).

In the example of FIG. 1, the quantum computing device 10 implements a set of one or more qubits 18(0)-18(Q) for use by quantum services executed by the quantum computing device 10. To maintain information for the qubit(s) 18(0)-18(Q), the quantum computing device 10 includes a qubit registry 22. The qubit registry 22 maintains and provides access to data relating to the qubits implemented by the quantum computing device 10, such as a count of the total number of qubits implemented by the quantum computing device 10 and a count of the number of available qubits that are currently available for allocation, as non-limiting examples. The qubit registry 22 also stores qubit metadata (not shown) for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an quantum phenomena indicator that indicates whether the corresponding qubit is in an entangled state and/or a superposition state.

The quantum computing device 10 of FIG. 1 executes one or more quantum services, such as the quantum service 20. The quantum service 20 may be a process that employ qubits such as the one or more qubits 18(0)-18(Q) to provide desired functionality.

The quantum computing device 10 of FIG. 1 implements a cold storage archiver (CSA) 24 and a superdense quantum communication driver (QCD) 26. The quantum computing device 10 may be communicatively coupled to other computing devices through a classical communication network 28.

The CSA 24 may be enabled to receive a classical file. The classical file may be received over the classical communication network 28. The classical file may encode data to be archived and/or put into long-term storage. The CSA may process the classical file and/or provide the classical file to the QCD 26. The QCD 26 may be enabled to receive the classical file (e.g., via the CSA 24 and/or the classical communication network 28), translate classical information encoded in the file, and encode the classical information in a set of qubits, via a superdense coding protocol. The QCD 26 may be further enabled to receive a set a set of qubits, measure the quantum states of the qubits to decode the information encoded in the qubits via a superdense coding protocol, and generate a classical file encoding the decoded information. The CSA 24 may be enabled to coordinate, manage, and/or oversee the distribution of content and content updates to one or more clients, as well as the operations of the QCD 26.

It is to be understood that, because the CSA 24 and/or the QCD 26 are components of the quantum computing device 10, functionality implemented by the CSA 24 and/or the QCD 26 may be attributed to the quantum computing device 10 generally. Moreover, in examples where the CSA 24 and/or the QCD 26 comprise software instructions that program the processor device 14 to carry out functionality discussed herein. Functionality implemented by the CSA 24 and/or the QCD 26 may be attributed herein to the processor device 14. It is to be further understood that while, for purposes of illustration only, the CSA 24 and/or the QCD 26 are depicted as a single components, the functionality implemented by the CSA 24 and/or the QCD 26 may be implemented in any number of components, and the examples discussed herein are not limited to any particular number of components.

Figure 2:
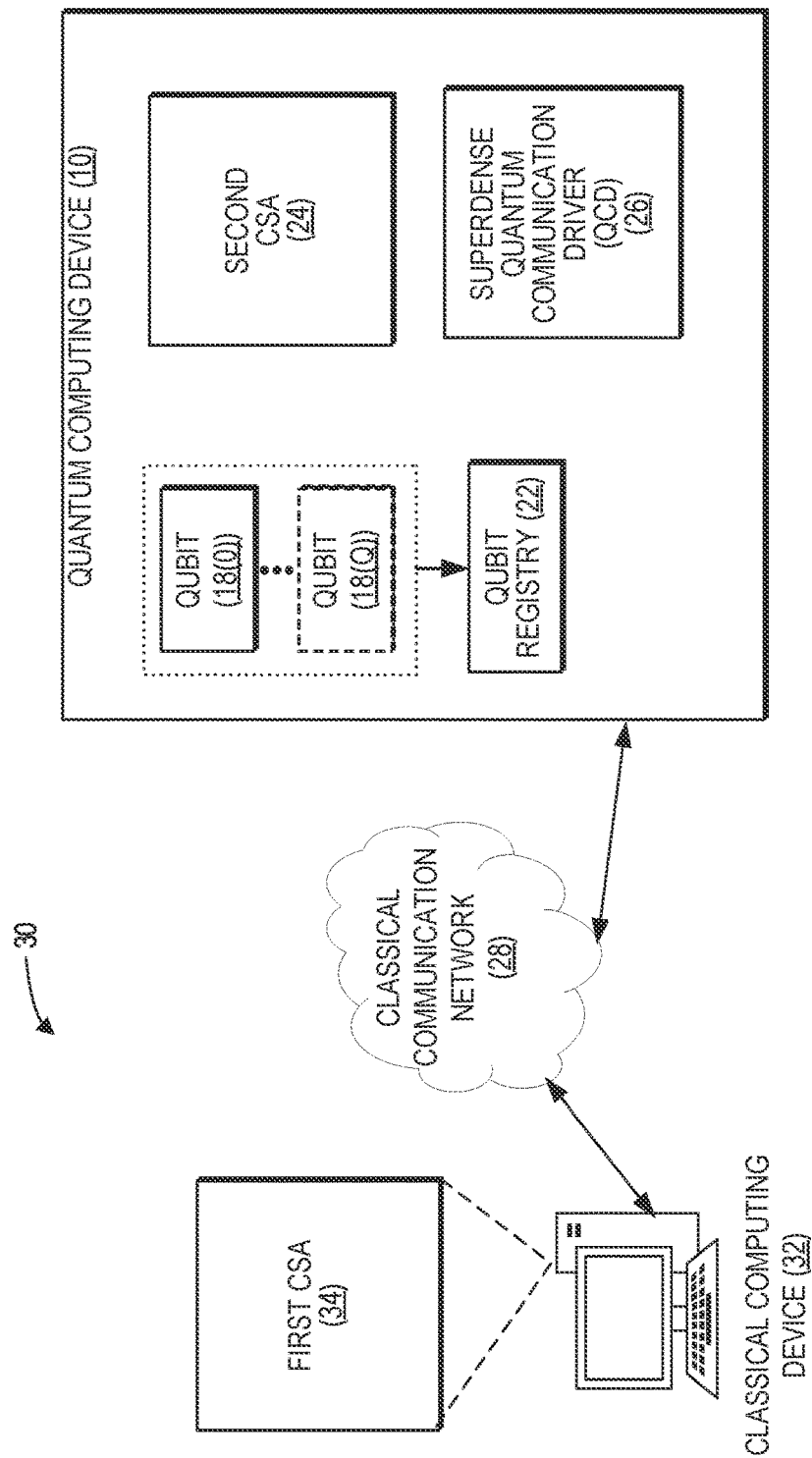
FIG. 2 is a block diagram of a quantum mechanical-based file archival environment that is consistent with various embodiments.

FIG. 2 is a block diagram of a quantum mechanical (QM)-based file archival environment 30 that is consistent with various embodiments. The environment 30 may include a classical computing device 32 and the quantum computing device 10 of FIG. 1. The classical computing device 32 and the quantum computing device 10 may be communicatively coupled via the classical communication network 28 of FIG. 1. The classical computing device 32 may implement a first cold storage archiver (CSA) 34. In the discussion of at least FIG. 2, the CSA 24 of FIG. 1 (e.g., of the quantum computing device 10) may be referred to as a second CSA.

The first CSA 34 may provide a request to archive a classical file in long-term storage (e.g., cold storage) to the second CSA 24. The classical file may store a classical encoding of data in a set of bits. The request to archive the classical file may additionally include an indication of a file identifier (ID) (e.g., a file name and/or a unique ID that uniquely identifies the file) corresponding to the classical file, and file permissions for the data stored in the file. In addition to the request, the first CSA 34 may provide a copy of and/or a link (e.g., a path and/or a storage address) to the second CSA 24.

The second CSA 24 may determine a number of qubits required to store a quantum file corresponding to classical file. The quantum file will store the data of the classical file in a quantum-mechanical (QM) encoding based on a superdense coding protocol. The determination of the number of qubits required to store the quantum file may be based on size of the corresponding classical file and a superdense coding protocol. The size of the classical file may be equivalent to the number of bits that are used to encode the data in the classical file. The size of the quantum file may be equivalent to the number of qubits required to QM encode the data in the classical file. Because the QM encoding is based on the superdense coding protocol, the size of the quantum file may be less than the size of the classical file. In at least one embodiment, the size of the quantum file is one-half the size of the size of the classical file.

In response to receiving the request to archive the classical file, the second CSA 24 may provide, to the qubit registry 22, a request to allocate a set of qubits based on the required number of qubits. A cardinality (or size) of the set of qubits may be equivalent to the number of qubits required to store the quantum file corresponding to the classical file. Based on the required number of qubits, the qubit registry 22 may provide a positive response to the second CSA 24 indicating an address of each qubit in a set of qubits. In response to the positive response, either the second CSA and/or the qubit registry 22 may cause an allocation and a registration of each qubit of the set of qubits. The allocation and/or registration of the set of qubits may indicate the address for each qubit of the set of qubits. In some embodiments, the second CSA 24 the first CSA 34 with an indication of the successfully archival of the data and/or the file ID corresponding to the quantum file. Note that the file ID may correspond to the classical file, the data, the quantum file, or a combination thereof.

After the allocation and/or registration of the set of qubits, the QCD 26 may cause a preparation of the quantum states of the set of qubits based on the superdense coding protocol. The preparation of the set of qubits may be such that the quantum states of the set of qubits store the QM encoding of the data. The second CSA 24 may generate metadata for the quantum file. The metadata may include indications of the set of qubits (e.g., the addresses of the qubits and a logical order or sequence of the addresses), the file ID, and file permissions for the data encoded in the quantum states of the qubits. The second CSA 24 may cause a storage of the metadata for the quantum file. Note that the metadata may be stored via classical means in bits. The metadata may be stored in a data structure. For instance, the second CSA 24 may cause a storage of a separate classical file that stores the data structure encoding the metadata in a classical file system implemented via classical storage means. Thus, the second CSA 34 may cause a generation of a data structure that encodes the metadata for the quantum file.

When the data that is in long-term (e.g., cold) storage is to be accessed and/or retrieved, the first CSA 34 may provide the second CSA 24 with a request to access a classical file that stores a classical encoding of the data archived in the quantum file. The request to access the classical file may include an indication of the file ID, and the credentials for the party requesting to access the archived data. The second CSA 24 may access the metadata for the quantum file based on the file ID. As noted above, the metadata for the quantum file may encode (e.g., in a data structure), indications for the file permissions for the data and the set of qubits (e.g., addresses and an order or sequence for addresses) that stores the QM encoding of the data. The second CSA 24 may verify that the requesting party has permission to access the data based on the file permissions of the data and the credentials of the requesting party.

In response to verifying that requester has permission to access data, the second CSA 24 and/or the QCD 26 may access the set of qubits based on indication of set of qubits. The QCD 26 may read (or measure) the quantum states of the set of qubits based on the superdense coding protocol.

The second CSA 24 and/or the QCD 26 may cause a generation of a classical file that stores a classical encoding of the data in a set of bits. The data may be determined based on the measured quantum states of set of qubits. The second CSA 24 and/or the qubit registry 222 may cause a de-registration and/or a deallocation of the set of qubits, as well as an erasure (or deletion) of the metadata. For instance, a separate classical file that stores the data structure encoding the metadata may be deleted from a classical file system. The second CSA 24 may cause a transmission of the classical file storing the data to the first CSA 34.

Figure 3A:
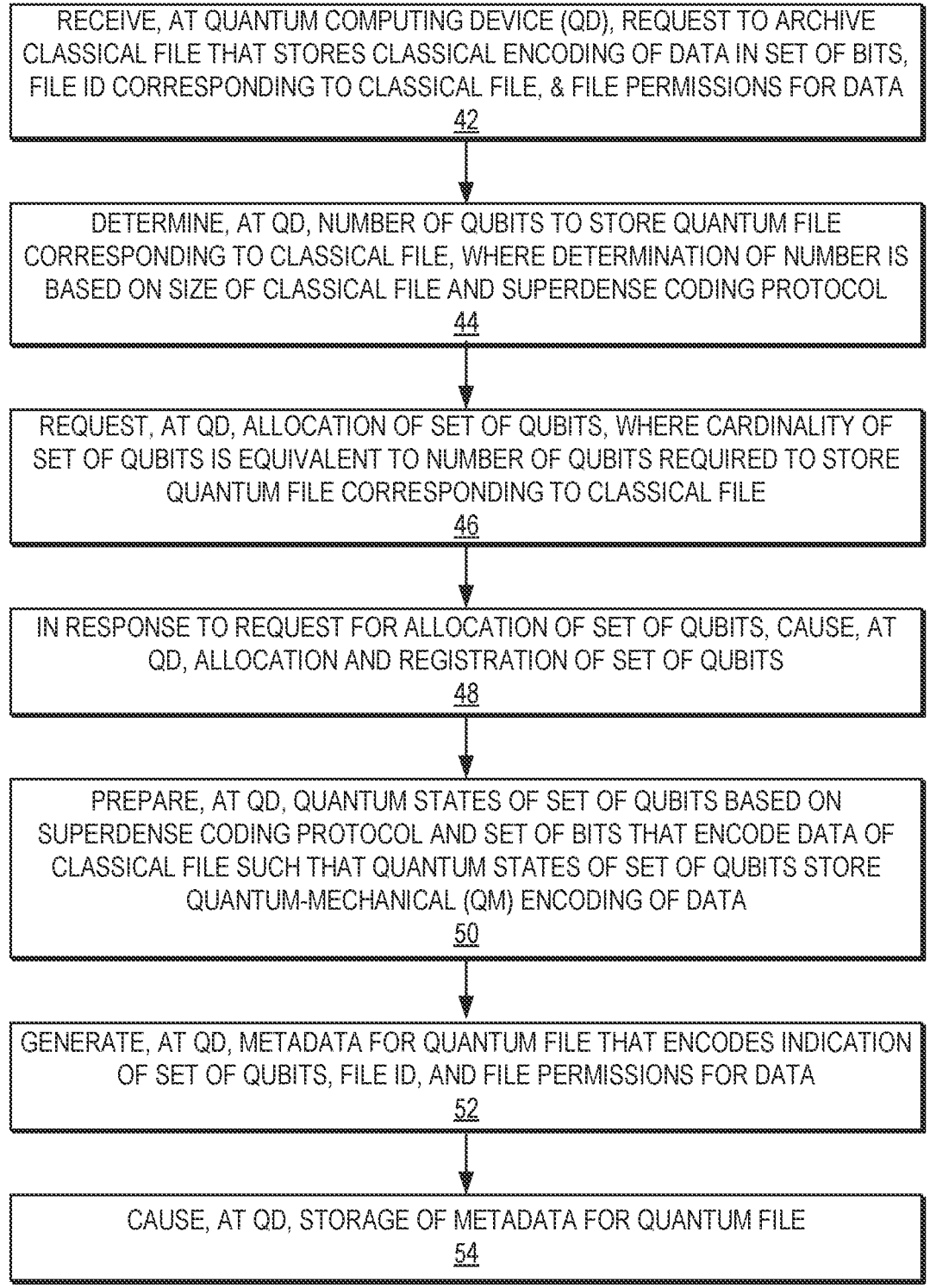
FIG. 3A provides a flowchart for a method for quantum-mechanically archiving data via superdense coding that is consistent with various embodiments FIG. 3B provides a flowchart for a method for accessing data that has been quantum-mechanically archived via superdense coding that is consistent with various embodiments.
Figure 3B:
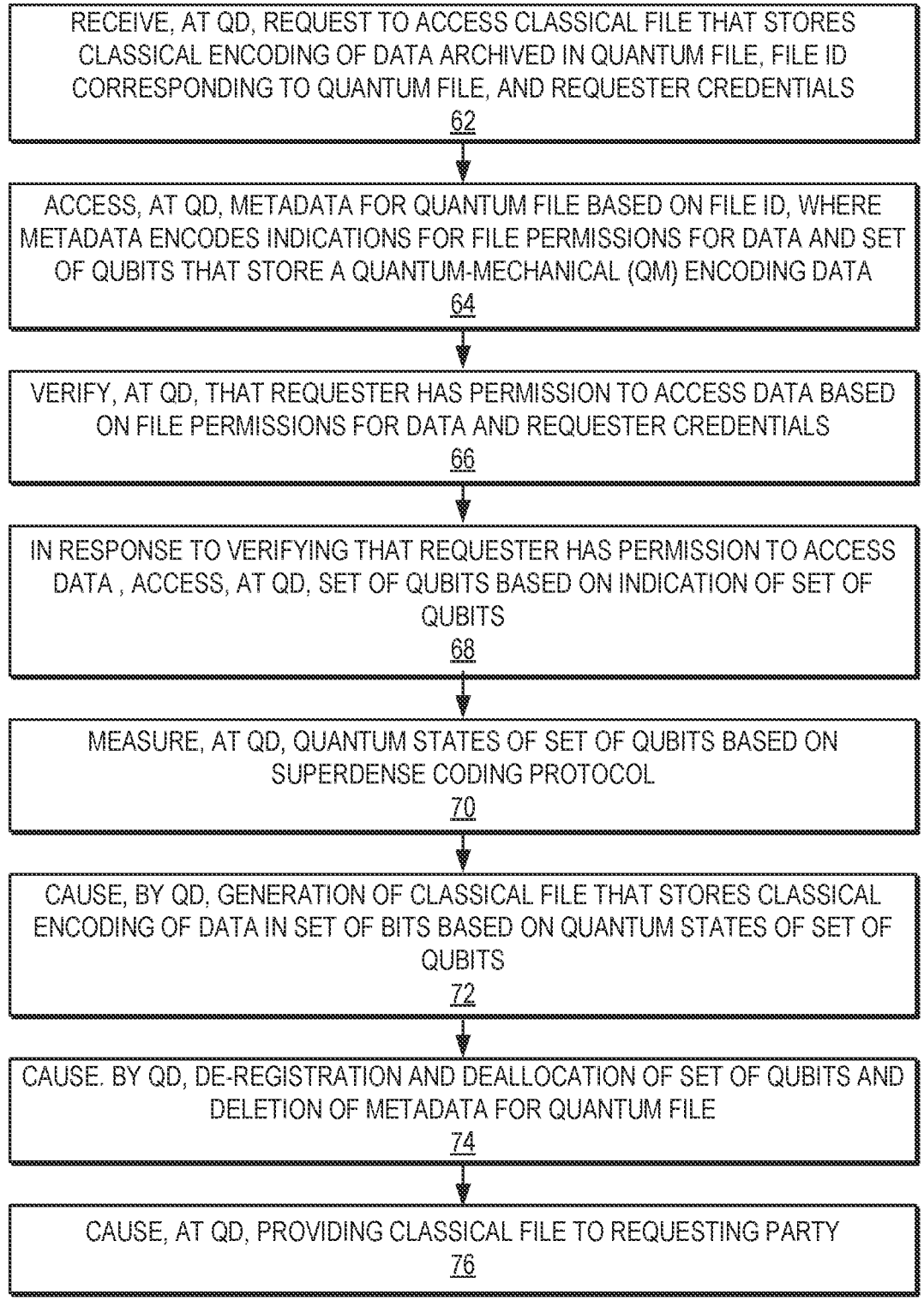

To illustrate exemplary operations performed by the quantum computing device 10 of FIG. 1 and/or within the environment 30 of FIG. 2 for providing long-term storage of data via superdense coding, FIGS. 3A-3B provide flowchart for methods 40 and 60 respectively. Elements of FIGS. 1-2 are referenced in describing FIGS. 3A-3B for the sake of clarity.

Method 40 begins, at block 42, where a request to archive a classical file is received at a quantum computing device (QD) (e.g., quantum computing device 10 of FIGS. 1-2). The classical file may store a classical encoding of data in a set of bits. Also at block 42, the QD may receive a file ID corresponding to classical file and file permissions for the data. Indications of the file ID and the file permissions may be encoded in the request to archive the classical file. At block 44, the QD may be employed to determine a number of qubits that are required to store a quantum file corresponding to the classical file. The determination of the number of qubits may be based on the size of classical file and a superdense coding protocol.

At block 46, the QD may be employed to request an allocation of set of qubits. A cardinality of the set of qubits may be equivalent to number of qubits required to store the quantum file corresponding to classical file. The cardinality of the set of qubits may be one-half of the cardinality of the set of bits encoding the data in the classical file. At block 48, and in response to the request for the allocation of the set of qubits, the QD may be employed to cause the allocation and a registration of the set of qubits.

At block 50, the QD may be employed to cause a preparation of the quantum states of the set of qubits based on a superdense coding protocol and the set of bits that encodes the data of the classical file. The preparation of the quantum states of the set of qubits may be such that the quantum states of the set of qubits store a quantum-mechanical (QM) encoding of the data. At block 52, the QD may be employed to cause a generation of metadata for the quantum file. The metadata may encode indications of the set of qubits, the file ID, and file permissions for data. The indication for the set of qubits may include an address for each qubit of the set of qubit and an order (or sequence) of the qubit addresses. The metadata may be encoded in a data structure. At block 54, the QD may be employed to cause storage of the metadata for the quantum file.

Method 60 of FIG. 3B, begins at block 62, where a request to access a classical file is received at a QD. The classical file may store a classical encoding of data archived in a quantum file. The QD may also receive a file ID corresponding to the quantum file and requester credentials for a requesting party at block 62. Indications of the file ID and the requester credentials may be included in the request to access the classical file and/or its associated data.

At block 64, metadata for the quantum file may be access at the QD. Accessing the metadata may be based on the file ID. The metadata for the quantum file may encodes indications for the file permissions for the data and a set of qubits that store a quantum-mechanical (QM) encoding data. At block 66, the QD may verify that the requesting party has permission to access the data. The verification may be based on the file permissions for the data and the requester credentials. At block 68, and in response to verifying that the requesting party has permission to access the data, the QD may access the set of qubits based on the indication of set of qubits (e.g., addresses for the qubits and an ordering and/or sequence for the qubits).

At block 70, the QD may cause a measurement of quantum states of the set of qubits based on a superdense coding protocol. At block 72, the QD may cause a generation of the requested classical file that stores a classical encoding of the data in set of bits based on the measured quantum states of the set of qubits. At block 74, the QD may cause a de-registration and/or a deallocation of the set of qubits and a deletion of the metadata for the quantum file. At block 76, the QD may cause a providing of the classical file to the requesting party.

Figure 4:
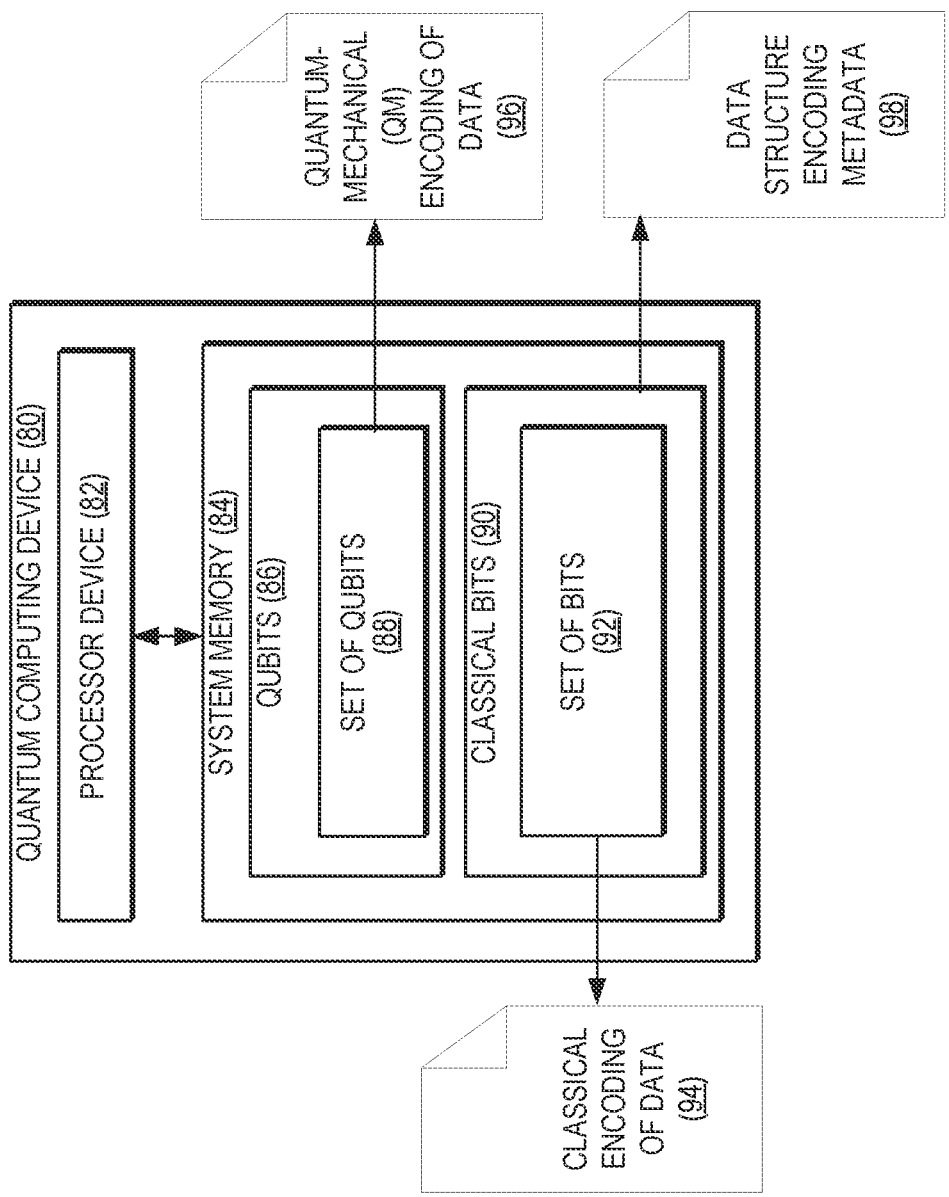
FIG. 4 is a simpler block diagram of the quantum computing device 10 of FIG. 1 for quantum-mechanically archiving data via superdense coding, according to one example.

FIG. 4 is a simpler block diagram of the quantum computing device 10 of FIG. 1 for providing updates for content via superdense coding, according to one example. In the example of FIG. 4, a quantum computing device 80 comprises a system memory 84 and a processor device 82. A first portion of the system memory 84 may be implemented by qubits 86. The qubits 86 may include a set of qubits 88. The set of qubits 88 has a second cardinality. A second portion of the system memory may be implemented by classical bits 90. The classical bits 90 may include a set of bits 92, which has a first cardinality. Also shown in FIG. 4 is a classical encoding 94 of data, a quantum-mechanical (QM) encoding 96 of the data, and a data structure 98 encoding metadata for a quantum file storing the QM encoding 96 of the data. Another set of bits may store the data structure 98.

In one embodiment, the processor device 82 is communicatively coupled to the system memory 84 such that the processor device 82 receives a request to store data that is associated with a file identifier (ID). The set of bits 92 encodes the data in a classical encoding 94 and the set of bits 92 has the first cardinality. In response to receiving the request to store the data, the processor device 82 generates, based on a superdense coding protocol, the QM encoding 96 of the data via the set of qubits 88. The processor device 82 may cause a generation of the data structure 98. The metadata encoded in the data structure 98 may encode an association between the file ID and the set of qubits 88. The processor device 82 may cause a storage of the data structure 98.

In another embodiment, the processor device 82 may receive a request to access the data that is associated with a file identifier (ID). The set of qubits 88 encodes the data in the QM encoding 96 of the data. In response to receiving the request to access the data, the processor device 82 may cause a generation of the classical encoding 94 of the data via the set of bits 92 based on a superdense coding protocol. The processor device 82 may cause a transmission of the classical encoding 94 of the data via the set of bits 92.

Figure 5A:
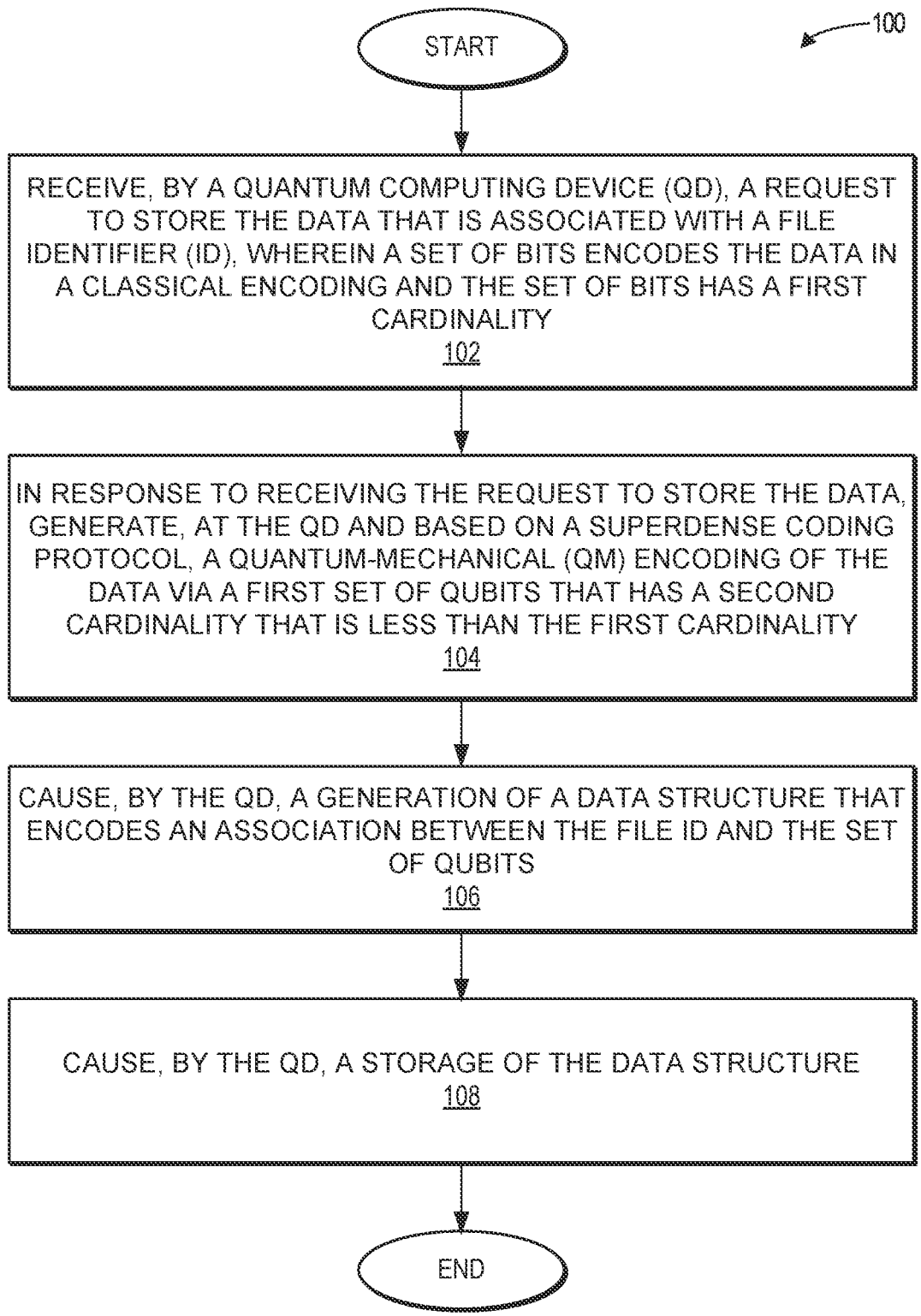
FIG. 5A provides a flowchart of a simplified method for quantum-mechanically archiving data via superdense coding, according to one example.

FIG. 5A provides a flowchart of a simplified method for archiving data, according to one example. Method 100 begins, after a start block, at block 102, where a quantum computing device (QD) receives a request to store the data that is associated with a file identifier (ID). A set of bits may encode the data in a classical encoding. The set of bits has a first cardinality.

At block 104, and in response to receiving the request to store the data, The QD may generate, based on a superdense coding protocol, a quantum-mechanical (QM) encoding of the data via a set of qubits. The set of qubits has a second cardinality that is less than the first cardinality. At block 106, the QD may cause a generation of a data structure that encodes an association between the file ID and the set of qubits. At block 108, the QD may cause a storage of the data structure.

Receiving the request to store the data may include the QD receiving a classical file that includes the set of bits and the file ID, wherein the file ID indicates the classical file. Receiving the request to store the data may also include the QD determining the first cardinality of the set of bits. The QD may identifying the set of qubits from a plurality of qubits accessible based in the first cardinality. The QD may cause a registration of the set of qubits. In response to causing the registration of the set of qubits, the QD may cause the association between the file ID and the set of qubits. Identifying the set of qubits from the plurality of qubits may include providing a request for an availability of a portion of the plurality of qubits to a qubit registry service of the QD. An indication of an address for each qubit of the set of qubits may be received from the qubit registry service.

Generating the QM encoding of the data may include the QD preparing quantum states of the set of qubits based on the superdense coding protocol. The quantum states of the set of qubits may store the QM encoding. In some embodiments, generating the QM encoding of the data may include identifying a sequential ordering of the set of qubits that is in accordance with the QM encoding of the data.

Causing the generation of the data structure may include encoding an address for each qubit of the set of qubits in the data structure. An ordering of the set of qubits may be encoded in the data structure. The ordering may indicate a sequence for the address of each qubit of the set of qubits.

Although not shown in FIG. 5A, method 100 may further include the QD receiving a request to access the data and an indication of the file ID. The QD may access the set of qubits based on the file ID. The QD may generate another classical encoding of the data via a second set of bits based on the superdense protocol and quantum states of the set of qubits.

The QD may transmit the other classical encoding of the data via the second set of bits.

The data structure may indicate one or more file permissions for the data. The request to access the data may further indicate credentials of a party that sent the request. The method may further include the QD verifying that the party that sent the request has permission to access the data based on the one or more file permissions for the data and the credentials of the party. In response to verifying that the party has permission to access the data, the QD may measure the quantum states of the set of qubits based on the superdense coding protocol. The QD may maintain a coherence of quantum states of the set of qubits such that QM encoding of the data is conserved by the set of qubits. The second cardinality of the set of qubits may be one-half the first cardinality of the set of bits.

Figure 5B:
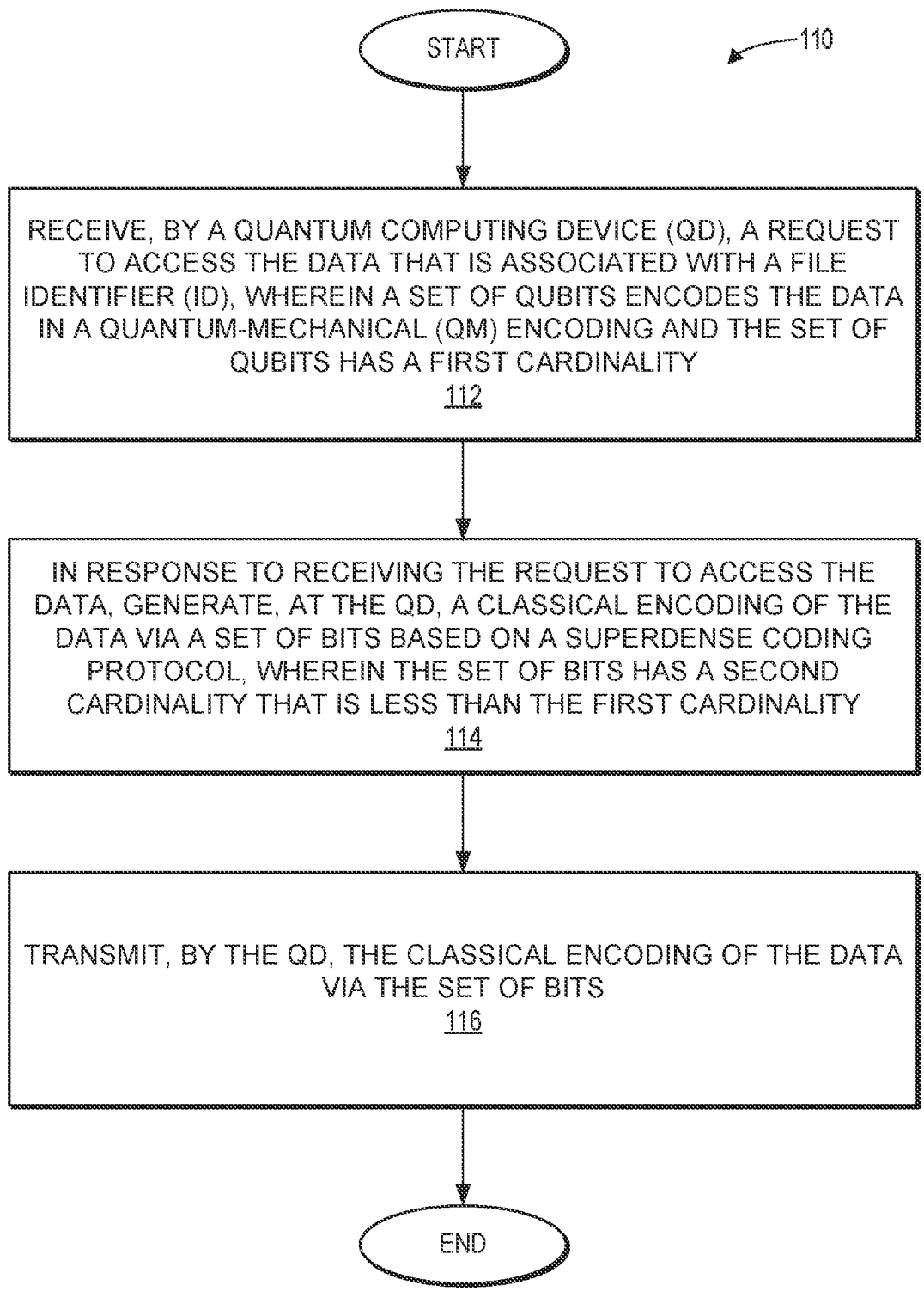
FIG. 5B provides a flowchart of another simplified method for accessing data that has been quantum-mechanically archived via superdense coding, according to one example.

FIG. 5B provides a flowchart of a simplified method 110 for accessing quantum-mechanically archived data, according to one example. Method 110 begins, after a start block, at block 102, where a quantum computing device (QD) receives a request to access the data. The data may be associated with a file identifier (ID). A set of qubits may encode the data in a QM encoding. The set of qubits may have a first cardinality. At block 114, and in response to receiving the request to access the data, the QD may generate a classical encoding of the data via a set of bits based on a superdense coding protocol. The set of bits has a second cardinality that is less than the first cardinality. At block 116, the QD may the classical encoding of the data via the set of bits.

Receiving the request to access the data may include the QD receiving the file ID. The file ID may uniquely identify a quantum file associated with the set of qubits. Generating the classical encoding of the data may include the QD measuring quantum states of the set of qubits based on the superdense coding protocol. Generating the classical encoding of the data may additionally and/or alternatively include identifying a sequential ordering of the set of qubits that is in accordance with the QM encoding of the data.

The request to access the data may further indicate the file ID and credentials of a party that sent the request. The method may further include accessing a data structure based on the file ID. The data structure may indicate one or more file permissions for the data. The QD may verify that the party that sent the request has permission to access the data based on the one or more file permissions for the data and the credentials of the party. In response to verifying that the party has permission to access the data, the QD may measure quantum states of the set of qubits based on the superdense coding protocol. The second cardinality of the set of bits may be two-times the first cardinality of the set of qubits.

Individuals will recognize improvements and modifications to the preferred examples of the disclosure. All such improvements and modifications are considered within the scope of the concepts disclosed herein and the claims that follow.

What is claimed is:

1. A method for archiving data, comprising:
   receiving, by a quantum computing device (QD), a request to store the data that is associated with a file identifier (ID), wherein a set of bits encodes the data in a classical encoding and the set of bits has a first cardinality;
   in response to receiving the request to store the data, generating, at the QD and based on a superdense coding protocol, a quantum-mechanical (QM) encoding of the data via a set of qubits that has a second cardinality that is less than the first cardinality;

causing, by the QD, a generation of a data structure that encodes an association between the file ID and the set of qubits; and causing, by the QD, a storage of the data structure.

2. The method of claim 1, wherein receiving the request to store the data comprises:

receiving, at the QD, a classical file that includes the set of bits and the file ID, wherein the file ID indicates the classical file.

3. The method of claim 1, wherein generating the QM encoding of the data comprises:

preparing, by the QD, quantum states of the set of qubits based on the superdense coding protocol such that the quantum states of the set of qubits store the QM encoding.

4. The method of claim 1, wherein receiving the request to store the data comprises:

determining, at the QD, the first cardinality of the set of bits;

identifying, based in the first cardinality, the set of qubits from a plurality of qubits accessible by the QD;

causing, by the QD, registration of the set of qubits; and in response to causing the registration of the set of qubits, causing, by the QD, the association between the file ID and the set of qubits.

5. The method of claim 4, wherein identifying the set of qubits from the plurality of qubits includes:

providing a request for an availability of a portion of the plurality of qubits to a qubit registry service of the QD; and receiving, from the qubit registry service, an indication of an address for each qubit of the set of qubits.

6. The method of claim 1, wherein generating the QM encoding of the data comprises:

identifying a sequential ordering of the set of qubits that is in accordance with the QM encoding of the data.

7. The method of claim 1, wherein causing the generation of the data structure comprises:

encoding an address for each qubit of the set of qubits in the data structure; and encoding an ordering of the set of qubits in the data structure, wherein the ordering indicates a sequence for the address of each qubit of the set of qubits.

8. The method of claim 1, further comprising:

receiving, at the QD, a request to access the data and an indication of the file ID;

accessing the set of qubits based on the file ID;

generating, by the QD, another classical encoding of the data via a second set of bits based on the superdense protocol and quantum states of the set of qubits; and transmitting, by the QD, the other classical encoding of the data via the second set of bits.

9. The method of claim 8, wherein the data structure indicates one or more file permissions for the data, the request to access the data further indicates credentials of a party that sent the request, and the method further comprises:

verifying, by the QD, that the party that sent the request has permission to access the data based on the one or more file permissions for the data and the credentials of the party; and in response to verifying that the party has permission to access the data, measuring quantum states of the set of qubits based on the superdense coding protocol.

10. The method of claim 1, further comprising:

maintaining, by QD, a coherence of quantum states of the set of qubits such that QM encoding of the data is conserved by the set of qubits.

11. The method of claim 1, wherein the second cardinality of the set of qubits is one-half the first cardinality of the set of bits.

12. A quantum computing device, comprising:

a set of qubits;

a system memory; and a processor device communicatively coupled to the system memory, the processor device to:

receive a request to store data that is associated with a file identifier (ID), wherein a set of bits encodes the data in a classical encoding and the set of bits has a first cardinality;

in response to receiving the request to store the data, generate, based on a superdense coding protocol, a quantum-mechanical (QM) encoding of the data via a set of qubits that has a second cardinality that is less than the first cardinality;

cause a generation of a data structure that encodes an association between the file ID and the set of qubits; and cause a storage of the data structure.

13. The quantum computing device of claim 12, wherein receiving the request to store the data comprises:

receiving a classical file that includes the set of bits and the file ID, wherein the file ID indicates the classical file.

14. The quantum computing device of claim 12, wherein generating the QM encoding of the data comprises:

preparing quantum states of the set of qubits based on the superdense coding protocol such that the quantum states of the set of qubits store the QM encoding.

* * * * *